(12) United States Patent
Matsuno et al.

(10) Patent No.: US 7,837,900 B2
(45) Date of Patent: Nov. 23, 2010

(54) ELECTRODE MATERIAL, METHOD OF MANUFACTURING THE ELECTRODE MATERIAL, ELECTRODE, AND NONAQUEOUS ELECTROLYTE BATTERY

(75) Inventors: Shinsuke Matsuno, Kashiwa (JP); Takao Sawa, Yokohama (JP); Tatsuoki Kono, Tokyo (JP); Norio Takami, Yokohama (JP); Fumiyuki Kawashima, Matsudo (JP); Toshiya Sakamoto, Yokohama (JP)

(73) Assignees: Kabushiki Kaisha Toshiba, Tokyo (JP); Toshiba Materials Co., Ltd., Yokohama (JP)

( * ) Notice: Subject to any disclaimer, the term of this patent is extended or adjusted under 35 U.S.C. 154(b) by 1353 days.

(21) Appl. No.: 11/282,837

(22) Filed: Nov. 21, 2005

(65) Prior Publication Data

US 2006/0110659 A1 May 25, 2006

(30) Foreign Application Priority Data

Nov. 25, 2004 (JP) .............................. 2004-340717

(51) Int. Cl.
*H01B 1/00* (2006.01)
(52) U.S. Cl. ...................... 252/500; 429/218.1; 252/512
(58) Field of Classification Search ................. 252/500; 429/218.1

See application file for complete search history.

(56) References Cited

U.S. PATENT DOCUMENTS

| 2004/0258993 | A1 | 12/2004 | Matsuno et al. |
| 2005/0214643 | A1 | 9/2005 | Matsuno et al. |
| 2006/0275663 | A1* | 12/2006 | Matsuno et al. .......... 429/218.1 |

FOREIGN PATENT DOCUMENTS

| JP | 10-102174 | * | 4/1998 |
| JP | 2000-311681 | | 11/2000 |
| JP | 2003-346793 | | 12/2003 |
| JP | 2006-120324 | | 5/2006 |

OTHER PUBLICATIONS

Zhuravleva et al., "Single Crystal X-ray Structure Investigation and Electronic Structure Studies of La-Deficient Nickel Stannide La4.87Ni12Sn24 Grown from Sn Flux," Z. Anorg. Allg. Chem., Unknown month 2003, 629 (2), pp. 327-334.*
U.S. Appl. No. 11/509,754, filed Aug. 25, 2006, Matsuno, et al.
U.S. Appl. No. 11/432,402, filed May 12, 2006, Matsuno, et al.
Shinsuke Matsuno, et al., "$La_3Ni_2Sn_7$ Ternary Intermetallic Phase for Lithium Insertion and Deinsertion", Journal of the Electrochemical Society, Electrochemical and Solid-State Letters, vol. 152, No. 8, Apr. 2005, pp. 234-236.
Shinsuke Matsuno, et al., "New intermetallic compound for lithium intercalation", The $45^{TH}$ Battery Symposium in Japan, Nov. 27-29, 2004, pp. 294-295.
Yuichi Akasaka, et al., "Anode Characteristics of Mechanically Alloyed Li-Ce-Sn Compounds on Lithium Secondary Battery", The $44^{TH}$ Battery Symposium in Japan, Nov. 4-6, 2003, pp. 430-431.

* cited by examiner

*Primary Examiner*—Mark Kopec
*Assistant Examiner*—Khanh Tuan Nguyen
(74) *Attorney, Agent, or Firm*—Oblon, Spivak, McClelland, Maier & Neustadt, L.L.P.

(57) ABSTRACT

An electrode material includes an alloy having a $Gd_3Ni_8Sn_{16}$ type crystal structure.

11 Claims, 3 Drawing Sheets

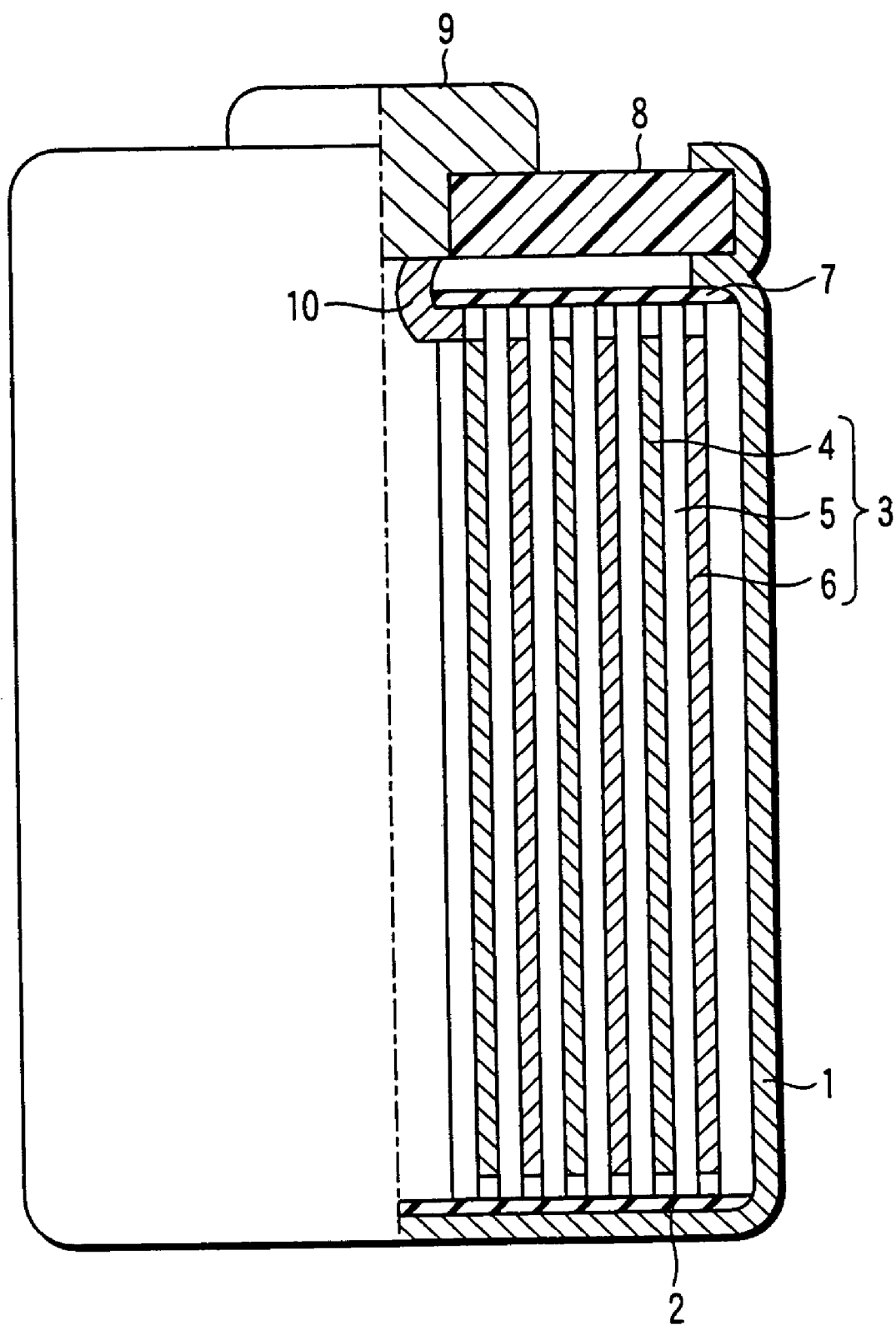
F I G. 1

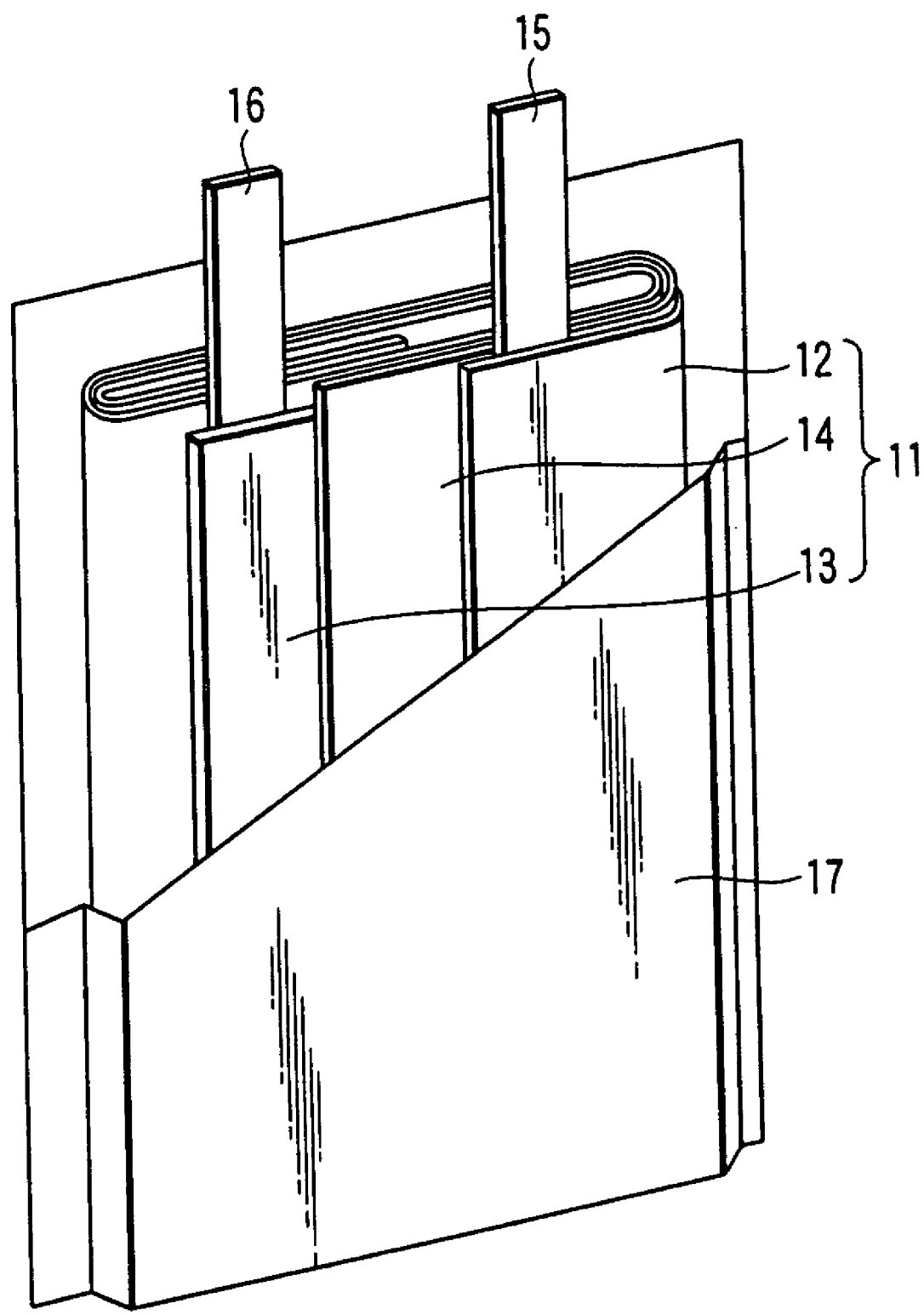
F I G. 2

ELECTRODE MATERIAL, METHOD OF MANUFACTURING THE ELECTRODE MATERIAL, ELECTRODE, AND NONAQUEOUS ELECTROLYTE BATTERY

CROSS-REFERENCE TO RELATED APPLICATIONS

This application is based upon and claims the benefit of priority from prior Japanese Patent Application No. 2004-340717, filed Nov. 25, 2004, the entire contents of which are incorporated herein by reference.

BACKGROUND OF THE INVENTION

1. Field of the Invention

The present invention relates to an electrode material, a method of manufacturing the electrode material, an electrode, and a nonaqueous electrolyte battery.

2. Description of the Related Art

A nonaqueous electrolyte battery using lithium as a negative electrode active material is recently noticed as a high energy density battery. A primary battery using manganese dioxide ($MnO_2$), carbon fluoride [$(CF_2)_n$], thionyl chloride ($SOCl_2$) or the like as a positive electrode active material has been already utilized widely as a power source for a pocket calculator or a watch, and a backup battery for a memory. Recently, along with the trend in reduction of size and weight of electronic appliances such as VTR and communication equipment, a secondary battery of high energy density is demanded as a power source, and a lithium secondary battery using lithium as a negative electrode active material has been intensively researched.

A lithium secondary battery having the configuration explained below is being studied. That is, a negative electrode contains lithium. A nonaqueous electrolysis solution is prepared by dissolving a lithium salt such as $LiClO_4$, $LiBF_4$, or $LiAsF_6$ in a nonaqueous solvent such as propylene carbonate (PC), 1,2-dimethoxy ethane (DME), γ-butyrolactone (γ-BL), or tetrahydrofuran (THF). Instead of the nonaqueous electrolysis solution, a lithium conductive solid electrolyte may be also used. A positive electrode contains a compound which performs topochemical reaction with lithium as a positive electrode active material. Examples of the compound include $TiS_2$, $MOS_2$, $V_2O_5$, $V_6O_{13}$, and $MnO_2$.

However, the above-described lithium secondary battery has not been realized yet. The main reason is that the lithium for use in the negative electrode is pulverized in the repeated process of charge and discharge to become reactive lithium dendrite, thereby lowering the safety of the battery or even leading to breakage, short-circuiting or thermal runaway of the battery. In addition, due to deterioration of the lithium, the efficiency of charge and discharge is lowered, and the cycle life becomes shorter.

Accordingly, instead of the lithium, it is proposed to use a carbonaceous material which intercalates and deintercalates lithium, such as a coke, a baked resin, carbon fibers, and pyrolytic vapor phase carbon. A recently commercialized lithium ion secondary battery comprises a negative electrode containing a carbonaceous material, a positive electrode containing $LiCoO_2$, and a nonaqueous electrolyte. In such a lithium ion secondary battery, owing to the recent demand for further reduction in size of electronic appliances or extended use time, it is required to further enhance the charge and discharge capacity per unit volume, and the development is in progress, but it is insufficient. It is hence needed to develop a new negative electrode material for realizing a battery of high capacity.

As a negative electrode material capable of obtaining higher capacity than a carbonaceous material, it is proposed to use single metals such as aluminum (Al), silicon (Si), germanium (Ge), tin (Sn) and antimony (Sb). In particular, when Si is used as a negative electrode material, a high capacity of 4200 mAh per unit weight (1 g) is obtained. In the negative electrode using such a single metal, however, the metal is microscopically pulverized by repetition of lithium insertion and deinsertion, so that a high charge and discharge cycle characteristic cannot be obtained.

To solve these problems, it has been attempted to enhance the charge and discharge cycle life by using an alloy containing element T1 which does not form an alloy with lithium and element T2 which forms an alloy with lithium as negative electrode materials. Examples of the element T1 which does not form an alloy with lithium include Ni, V, Ti and Cr. To suppress pulverization which causes to deteriorate cycle characteristic, for example, volume expansion is suppressed by dispersing a phase that is active with lithium (for example, element T2 phase) and a phase that is inactive with lithium (for example, element T1 phase) in nano scale. Or, to suppress the pulverization, an amorphous alloy is used as the negative electrode material.

In any negative electrode material mentioned above, lithium is absorbed in the negative electrode material by causing an alloying reaction between the negative electrode material and lithium. An example of a first charge reaction is shown in the following formula (A).

$$T1_xT2_y + Li \rightarrow xT1 + LiT2_y \quad (A)$$

After the first charge and discharge reaction, second and subsequent charge and discharge reactions will proceed in the reaction shown in the following formula (B).

$$xT1 + LiT2_y \Leftrightarrow Li + yT2 \quad (B)$$

Since the reaction does not progress completely reversible in the second and subsequent reaction process (B), Li is collected in the alloy, and as the cycles are repeated, lithium supply source is lost, so that the cycle cannot be repeated. In an amorphous alloy, the reaction progress is very smooth at an initial stage. However, as cycles are repeated, crystallization is progressed, and cycle deterioration occurs.

In addition, the negative electrode material causing an alloying reaction with lithium at the time of charge is high in reactivity with a nonaqueous electrolyte containing a non-aqueous solvent such as ethylene carbonate, and a film of $Li_2CO_3$ or the like is formed on the surface of the negative electrode by a reaction between lithium in the negative electrode material and the nonaqueous electrolyte. Therefore, coulomb efficiency of the negative electrode during a charge and discharge cycle is lowered. Further, in the case of using as a positive electrode active material a Li-containing composite oxide such as $LiCoO_2$, Li in the positive electrode active material comes into shortage as the charge and discharge cycle progresses, and thus, obvious capacity deterioration is observed.

An example of the negative electrode material causing an alloying reaction with lithium at the time of charge is disclosed in Jpn. Pat. Appln. KOKAI Publication No. 2000-311681. This publication discloses a negative electrode material for a lithium secondary battery containing particles mainly composed of an amorphous Sn.A.X alloy of a non-stoichiometric composition (A denotes at least one transition metal; X denotes at least one selected from the group consisting of O, F, N, Mg, Ba, Sr, Ca, La, Ce, Si, Ge, C, P, B, Bi, Sb, Al, In, S, Se, Te and Zn; and the ratio of atomic number is Sn/(Sn+A+X)=20 to 80 at. %). In the amorphous alloy disclosed in the publication, absorption and release of lithium occurs due to the alloying reaction with lithium. Therefore, the irreversible capacity is likely to occur by repetition of charge and discharge cycles, and the charge and discharge cycle life becomes short.

Another example of the negative electrode material is mentioned in pages 430 and 431 in Collected Papers of 44th Battery Symposium in Japan (Nov. 4, 2003). This document describes that Yuichi AKASAKA of Tottori University and others synthesized a $Li_xCeSn_3$ compound by mechanical alloying, and attempted to use the compound in a negative electrode of a lithium secondary battery. The Collected Papers also report that, when lithium is added to a base alloy ($CeSn_3$) by mechanical alloying, the volume change due to lithium absorption and release in the obtained alloy is lessened.

However, in the $Li_xCeSn_3$ alloy mentioned in the paper, the charge and discharge cycle life is only about 10 cycles at most, as shown in FIG. 3.

Jpn. Pat. Appln. KOKAI Publication No. 2003-346793 discloses realization of a lithium secondary battery in which high discharge capacity and excellent cycle characteristic have been achieved by paying attention to an $RSn_3$ phase (R=a rare earth metal element) having a strong polarity and resistance to pulverization. The negative electrode of the lithium secondary battery uses an alloy having a basic skeleton of $RSn_3$—$Li_x(0 \leq x \leq 13)$ in which Li amount x is correspond to a remaining amount of Li in the alloy caused by first charge and discharge cycle. The alloy is prepared by high frequency induction heating. An embodiment of Jpn. Pat. Appln. KOKAI Publication No. 2003-346793 describes that, in order to obtain the $RSn_3$ phase, a transition metal element such as Co, Ni, Fe, Cu, V and Cr is not added at all, or added only very slightly. Jpn. Pat. Appln. KOKAI Publication No. 2003-346793 also mentions that the initial discharge capacity is extremely lowered when the contents of such transition metal elements are increased.

However, the alloy containing the $RSn_3$ phase disclosed in Jpn. Pat. Appln. KOKAI Publication No. 2003-346793 is very large in volume change due to lithium absorption and release, as with the alloy mentioned in the above collected paper, and therefore, a sufficient charge and discharge cycle life is not obtained.

BRIEF SUMMARY OF THE INVENTION

It is an object of the invention to provide a nonaqueous electrolyte battery excellent in initial charge and discharge efficiency, discharge capacity per volume, and charge and discharge cycle characteristic, an electrode material capable of realizing the nonaqueous electrolyte battery, a method of manufacturing the electrode material, and an electrode using the electrode material.

According to a first aspect of the present invention, there is provided an electrode material comprising an alloy having a $Gd_3Ni_8Sn_{16}$ type crystal structure.

According to a second aspect of the present invention, there is provided an electrode comprising an alloy having a $Gd_3Ni_8Sn_{16}$ type crystal structure.

According to a third aspect of the present invention, there is provided a nonaqueous electrolyte battery comprising:
a negative electrode comprising an alloy having a $Gd_3Ni_8Sn_{16}$ type crystal structure;
a positive electrode; and
a nonaqueous electrolyte.

According to a fourth aspect of the present invention, there is provided an electrode material comprising an alloy containing a main phase of an intermetallic compound that comprises a R element, Sn, a M element and a Z element, the alloy having a composition represented by the following formula (2):

$$R_aSn_bM_cT_dX_eA_fZ_g \qquad (2)$$

where R is at least one element selected from rare earth elements; M is at least one element selected from the group consisting of Co, Ni, Fe, Cu, Mn, V and Cr; T is at least one element selected from the group consisting of Ti, Zr, Hf, Nb, Ta, Mo and W; X is at least one element selected from the group consisting of Si, Al, Sb and In; A is at least one element selected from the group consisting of Mg, Ca, Sr and Ba; Z is at least one element selected from the group consisting of C, N, B and P; and a, b, c, d, e, f and g satisfy a+b+c+d+e+f+g=100 at. %, $5 \leq a \leq 35$, $38 \leq b \leq 55$, $8 \leq c \leq 30$, $0 \leq d \leq 10$, $0 \leq e \leq 20$, $0 \leq f \leq 20$, and $0 \leq g \leq 30$.

According to a fifth aspect of the present invention, there is provided an electrode comprising an alloy containing a main phase of an intermetallic compound that comprises a R element, Sn, a M element and a Z element, the alloy having a composition represented by the above formula (2).

According to a sixth aspect of the present invention, there is provided a nonaqueous electrolyte battery comprising:
a negative electrode comprising an alloy containing a main phase of an intermetallic compound that comprises a R element, Sn, a M element and a Z element, the alloy having a composition represented by the above formula (2);
a positive electrode; and
a nonaqueous electrolyte.

According to a seventh aspect of the present invention, there is provided a method of manufacturing an electrode material, comprising:

heating an alloy containing a main phase of an intermetallic compound that comprises a R element, Sn and a M element in an atmosphere containing at least one of C and N in a temperature range of 200° C. or more and 800° C. or less, so as to have a composition represented by the following formula (2):

$$R_aSn_bM_cT_dX_eA_fZ_g \qquad (2)$$

where R is at least one element selected from rare earth elements; M is at least one element selected from the group consisting of Co, Ni, Fe, Cu, Mn, V and Cr; T is at least one element selected from the group consisting of Ti, Zr, Hf, Nb, Ta, Mo and W; X is at least one element selected from the group consisting of Si, Al, Sb and In; A is at least one element selected from the group consisting of Mg, Ca, Sr and Ba; Z is at least one element selected from the group consisting of C, N, B and P; and a, b, c, d, e, f and g satisfy a+b+c+d+e+f+g=100 at. %, $5 \leq a \leq 35$, $38 \leq b \leq 55$, $8 \leq c \leq 30$, $0 \leq d \leq 10$, $0 \leq e \leq 20$, $0 \leq f \leq 20$, and $0 \leq g \leq 30$.

BRIEF DESCRIPTION OF THE SEVERAL VIEWS OF THE DRAWING

FIG. 1 is a partial sectional view of a cylindrical nonaqueous electrolyte secondary battery according to one embodiment of the present invention;

FIG. 2 is a partially cut-away perspective view of a thin type nonaqueous electrolyte secondary battery according to another embodiment of the present invention.

DETAILED DESCRIPTION OF THE INVENTION

First Embodiment

Figure 3:
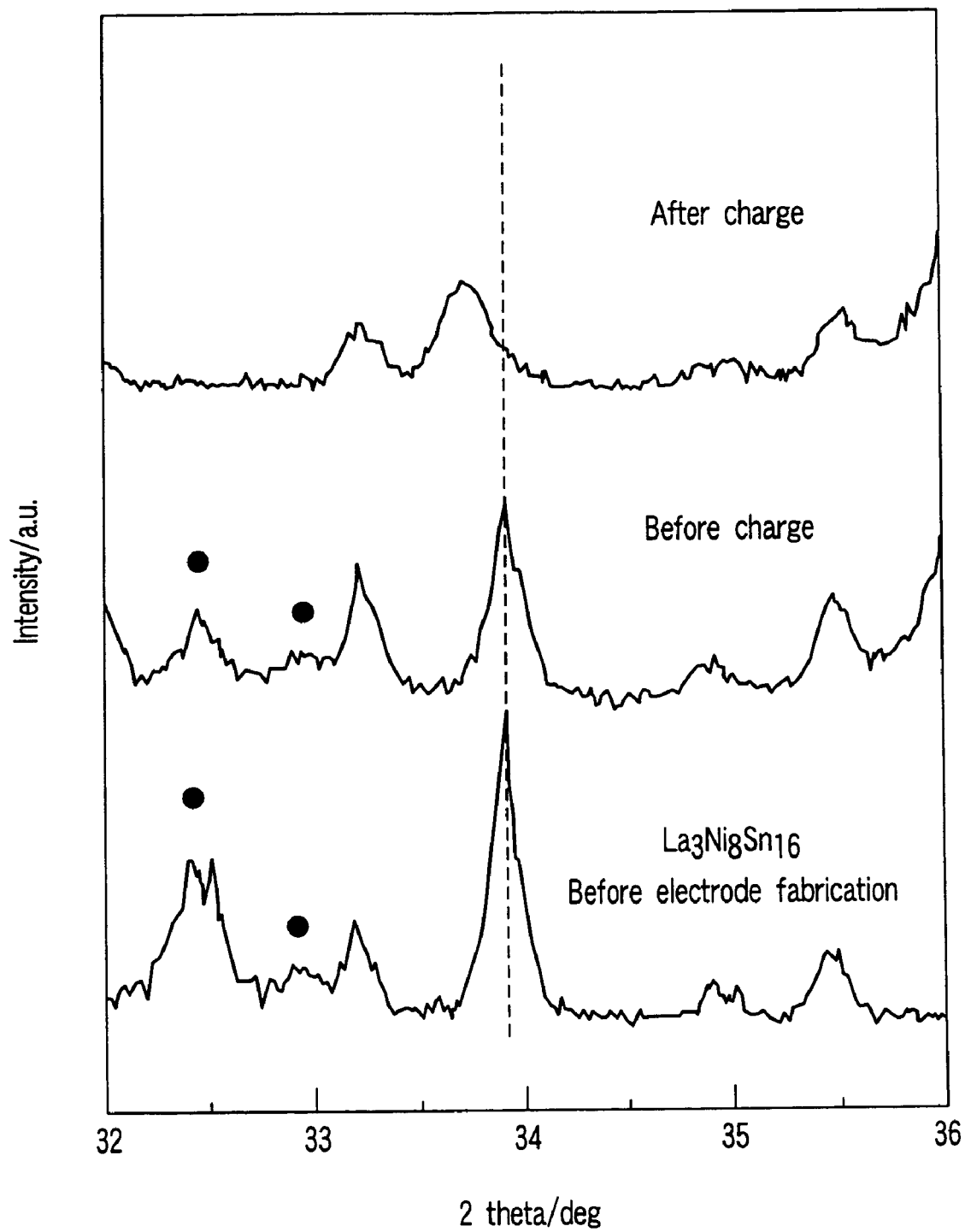
FIG. 3 is a characteristic diagram showing X-ray diffraction patterns of a negative electrode active material in three states of initial states (before and after fabrication of electrode) and charge state of a nonaqueous electrolyte secondary battery in Example 1.

An electrode material for a nonaqueous electrolyte battery according to a first embodiment of the invention will be explained. The electrode material for nonaqueous electrolyte battery contains an alloy having a crystal structure of $Gd_3Ni_8Sn_{16}$ type.

The present inventors have discovered the following facts (I) and (II) by using the alloy having the crystal structure.

(I) An electrode containing the alloy can cause a charge reaction by insertion of lithium or lithium ions, and at the same time can promote deinsertion of lithium or lithium ions at the time of discharge.

(II) An electrode containing the alloy can realize a nonaqueous electrolyte battery excellent in initial charge and discharge effect, discharge capacity per volume, and charge and discharge cycle characteristic.

Examples of the alloy capable of intercalating lithium or lithium ions in a crystal structure thereof include a negative electrode material having a crystal structure of $La_3Co_2Sn_7$ type, and a negative electrode material having a crystal structure of $CeNiSi_2$ type. By using these negative electrode materials, although lithium is intercalated in a charge operation, much lithium is not deintercalated in a discharge operation, that is, the initial efficiency is poor. In negative electrode materials having these structures, the initial efficiency is about 70%, and capacity deterioration is large in initial charge and discharge. For this reason, it is difficult to exhibit its excellent cycle performance and capacity per volume sufficiently.

Since the electrode material containing the alloy having the crystal structure of $Gd_3Ni_8Sn_{16}$ type intercalates and deintercalates lithium or lithium ions in charge and discharge operation, volume change of the lattice in charge can be made small, and an excellent cycle characteristic can be obtained. At the same time, the deinsertion characteristic is improved, and consequently, the ratio of the discharge capacity to the initial charge capacity can be increased. Therefore, by using this electrode material in the negative electrode material of the nonaqueous electrolyte battery, the initial charge and discharge efficiency and the charge and discharge cycle characteristic can be enhanced while maintaining the capacity per volume at a high level.

The alloy having a crystal structure of $Gd_3Ni_8Sn_{16}$ type may be a single-phase alloy of the $Gd_3Ni_8Sn_{16}$ type crystal phase, or may also contain a phase other than the crystal phase of $Gd_3Ni_8Sn_{16}$ type. Although it is specifically difficult to judge the mechanism by which lithium or lithium ions is inserted in the lattice, it is possible to confirm that the crystal lattice is expanded isotropically by X-ray diffraction, and thus, it is known that insertion of lithium or lithium ions is not accompanied by phase transition.

The alloy having the crystal structure of $Gd_3Ni_8Sn_{16}$ type is desired to have a composition represented by the following formula (1):

$$Li_zLn_3M1_xM2_y \quad (1)$$

where Ln is at least one element selected from elements having an atom radius in a crystal in a range of $1.6 \times 10^{-10}$ m or more and $2.2 \times 10^{-10}$ m or less; M1 is at least one element selected from the group consisting of Ti, V, Cr, Mn, Fe, Co, Ni, Cu, Zn and Nb; M2 is at least one element selected from the group consisting of P, Si, Ge, Sn and Sb; and x, y and z are defined by atomic ratio as $7.5 \leq x \leq 8.5$, $15.5 \leq y \leq 16.5$, and $0 \leq z \leq 3.0$.

By using, as Ln, at least one element selected from elements having atom radius in crystal in a range of $1.6 \times 10^{-10}$ m or more and $2.2 \times 10^{-10}$ m or less, lithium ions are easily inserted between layers of a crystal. If an element having an atom radius exceeding $2.2 \times 10^{-10}$ m or less than $1.6 \times 10^{-10}$ m is used as Ln, it is difficult to maintain the crystal structure of $Gd_3Ni_8Sn_{16}$ type, or impossible to insert lithium ions between layers.

Of elements Ln, preferred elements include La (atom radius is $1.88 \times 10^{-10}$ m), Ce (atom radius is $1.83 \times 10^{-10}$ m), Pr (atom radius is $1.83 \times 10^{-10}$ m), Nd (atom radius is $1.82 \times 10^{-10}$ m), Pm (atom radius is $1.80 \times 10^{-10}$ m), Sm (atom radius is $1.79 \times 10^{-10}$ m), Mg (atom radius is $1.60 \times 10^{-10}$ m), Ca (atom radius is $1.97 \times 10^{-10}$ m), Sr (atom radius is $2.15 \times 10^{-10}$ m), Ba (atom radius is $2.18 \times 10^{-10}$ m), Y (atom radius is $1.82 \times 10^{-10}$ m), Zr (atom radius is $1.62 \times 10^{-10}$ m) and Hf (atom radius is $1.60 \times 10^{-10}$ m).

At least one element M1 selected from the group consisting of Ti, V, Cr, Mn, Fe, Co, Ni, Cu, Zn and Nb is contained in the alloy, whereby the crystal structure of $Gd_3Ni_8Sn_{16}$ type can be stabilized. However, if the atomic ratio x of element M1 is less than 7.5 or more than 8.5, the crystal structure of $Gd_3Ni_8Sn_{16}$ type may not be obtained, and therefore, the atomic ratio x is preferred to be 7.8 or more and 8.4 or less. Among elements M1, at least one of Co and Ni is particularly preferred.

If the atomic ratio y of element M2 is less than 15.5, the ratio of the crystal structure other than $Gd_3Ni_8Sn_{16}$ type may be increased. On the other hand, if the atomic ratio y of element M2 exceeds 16.5, a phase which performs an alloying reaction with lithium (for example, LnSn phase) is much generated, and thus, the charge and discharge cycle life may be shortened. A more preferred range of the atomic ratio y is 15.7 to 16.4. Among elements M2, at least one of Sn and Si is particularly preferred.

In the alloy having the crystal structure of $Gd_3Ni_8Sn_{16}$ type, lithium can be added preliminarily. By adding lithium preliminarily, the initial efficiency can be enhance with maintaining the high discharge capacity. The amount of lithium added is preferably in a range of $0 \leq z \leq 3.0$ in the above chemical formula (1). An alloy containing lithium at a high concentration such that the lithium composition z exceeds 3.0 and having the structure of $Gd_3Ni_8Sn_{16}$ type is low in stability in air, and is oxidized easily, which may cause problems such that an initial irreversible capacity increases.

The alloy having the crystal structure of $Gd_3Ni_8Sn_{16}$ type is prepared, for example, by a high frequency induction heating method. In the high frequency induction heating method, a molten material may be poured onto a rotating cooling plate at the time of casting, and the cooling speed can be controlled by adjusting the molten material supply amount and the moving speed of the cooling plate. The obtained material can be subjected to heat treatment in order to homogenize the texture and composition. Although the heat treatment temperature is depended on the lithium content in the alloy, a preferred temperature of heat treatment is 600° C. or more and 700° C. or less, and a more preferred heat treatment is 5 minutes to 10 minutes at 650° C.

Second Embodiment

An electrode material for a nonaqueous electrolyte battery according to a second embodiment of the invention will be explained. The electrode material for a nonaqueous electrolyte battery contains an alloy containing a first main phase of an intermetallic compound comprising R element, Sn, M element and Z element as essential components, the alloy having a composition represented by the following formula (2):

$$R_a Sn_b M_c T_d X_e A_f Z_g \qquad (2)$$

where R is at least one element selected from rare earth elements; M is at least one element selected from the group consisting of Co, Ni, Fe, Cu, Mn, V and Cr; T is at least one element selected from the group consisting of Ti, Zr, Hf, Nb, Ta, Mo and W; X is at least one element selected from the group consisting of Si, Al, Sb and In; A is at least one element selected from the group consisting of Mg, Ca, Sr and Ba; Z is at least one element selected from the group consisting of C, N, B and P; and a, b, c, d, e, f and g satisfy a+b+c+d+e+f+g=100 at. %, $5 \leq a \leq 35$, $38 \leq b \leq 55$, $8 \leq c \leq 30$, $0 \leq d \leq 10$, $0 \leq e \leq 20$, $0 \leq f \leq 20$, and $0 \leq g \leq 30$.

As a result of intensive studies, the inventors have discovered that an alloy containing a first main phase of an intermetallic compound comprising R element, Sn, M element and Z element can be obtained by defining the contents of the R element, Sn, M element and Z element in the range specified above. This alloy makes it possible to cause a charge reaction by insertion of lithium or lithium ions, and to promote deinsertion of lithium or lithium ions in discharge, so that a nonaqueous electrolyte battery excellent in initial charge and discharge efficiency, discharge capacity per volume, and charge and discharge cycle characteristic can be realized.

The electrode material according to the second embodiment is preferred to have an intermetallic compound phase consisting of a single phase, but may also have at least one different phase. The former is excellent in the charge and discharge cycle characteristic, and the latter is excellent in both high capacity and initial charge and discharge efficiency. An average crystal grain diameter of the crystal phase is not particularly limited, but the average crystal grain diameter is preferred to be in a range of 100 nm to 10 μm.

A nonaqueous electrolyte secondary battery comprising a negative electrode containing the above electrode material as a negative electrode active material can satisfy the volume energy density, the initial charge and discharge efficiency, and the charge and discharge cycle life all at the same time.

That is, in the above alloy, (a) lithium is present in the negative electrode, specifically, in a crystal grain boundary or crystal grain of the negative electrode alloy, or (b) lithium or lithium ions, for example, can intercalate in a crystal lattice. Charge and discharge take place by occurrence of either one or both of (a) and (b), and charge or discharge is hardly caused by a so-called alloying reaction (for example, a reaction shown in the following chemical formula I). Consequently, an increase of the irreversible capacity due to progress of the charge and discharge cycle can be suppressed, and the charge and discharge cycle life of the battery can be extended. Further, since the alloy is high in Sn ratio by weight, the lithium insertion amount can be increased, and the energy density of the battery can be increased.

Further, since the alloy is mainly formed of an intermetallic compound phase in which the Z element is inserted in the crystal lattice formed of the R element, Sn and M element, lithium release performance is enhanced, and the initial charge and discharge efficiency becomes higher.

$$Li + Sn \Leftrightarrow LiSn \qquad (I)$$

The alloy is desired to be crystalline. In particular, an intermetallic compound of a single phase is preferred, but it may be formed of at least two crystal phases. The basic phase is a phase containing R, Sn, M and Z as four essential components, and plural phases may be formed by adding at least another phase different in composition ratio selected from the group consisting of an R—Sn-M phase, an R—Sn phase, an Sn-M phase, and an R-M phase. In the case of a single phase, an extremely stable charge and discharge cycle can be realized.

The intermetallic compound phase comprising R element, Sn, M element and Z element as essential components, and the intermetallic compound phase comprising R element, Sn and M element as essential components (these intermetallic compounds are hereinafter called R—Sn-M phase) can repeat charge and discharge cycles of Li or Li ions, for example, by insertion reaction, and therefore, contribute to extension of cycle life. In this R—Sn-M phase, a phase other than the main phase may be formed due to slight deviation of the composition ratio, and the formed phase may cause the alloying reaction shown in the following formula (C) in parallel to, for example, the insertion reaction mentioned above.

The term "insertion" used herein means a reversible change of a predetermined diffraction line when the X-ray diffraction pattern is measured repeatedly from charge to discharge.

On the other hand, the R-M phase does not react with Li, but other phases react with Li although the reaction speed is different, and can contribute to higher capacity. The R—Sn phase and Sn-M phase can cause the alloying reactions shown in the following formulas (A) and (B). However, these phases are preferred to be smaller in quantities.

$$R—Sn + xLi \rightarrow R + Li_x Sn Li_x Sn \rightarrow xLi + Sn \qquad (A)$$

$$Sn-M + xLi \rightarrow M^+ Li_x Sn Li_x Sn \rightarrow xLi + Sn \qquad (B)$$

$$R—Sn-M + xLi \rightarrow RM^+ Li_x Sn Li_x Sn \rightarrow xLi + Sn \qquad (C)$$

Therefore, the M phase, R-M phase and R phase gradually increases in the negative electrode during use, and the R—Sn phase or M-Sn phase may be lost depending on the number of charge and discharge cycles. In addition, in the reversible reactions of bonding and separating Sn and Li in the above formulas (A) to (C), a Li—Sn alloy may be formed.

The alloy mainly formed of an intermetallic compound phase comprising R element, Sn, M element and Z element as essential components means an alloy having the largest abundance of the intermetallic compound phase. The abundance of the intermetallic compound phase can be confirmed, for example, by X-ray diffraction intensity or an occupied area ratio in an electron micrograph.

In the case of a crystal structure of the alloy mainly formed of the intermetallic compound phase comprising R element, Sn, M element and Z element as essential components, either a rhombohedral system ($R_3 Co_2 Sn_7$ type, $R_3 Ni_2 Sn_6$ type, etc.) or a cubic system ($R_3 Ni_8 Sn_{16}$ type) is preferred, and a tetragonal system may be also used. The intermetallic compound phase is not limited to a crystal phase formed of three essential elements of R, Sn and M, but may include other crystal phases formed of the three essential elements and substitute elements (for example, T element, A element, and X element) with the same crystal structure as the crystal phase.

In the intermetallic compound phase comprising R element, Sn, M element and Z element as essential components, the composition ratio (atomic ratio) of the R element, Sn and M element is preferred to be 3:2:6, 3:2:7, or 3:8:16. Herein, the composition basically consisting of 3:2:6, 3:2:7, or 3:8:16 means that the composition ratio may slightly deviate from 3:2:6, 3:2:7, and 3:8:16.

The number of crystal phases contained in the alloy may be one or two or more, but a single phase is preferred from the viewpoint of the charge and discharge cycle life.

An average crystal grain diameter of a crystal phase contained in the alloy is preferred to be 100 nm or more and 10 μm (10000 nm) or less. The reason is explained below. When crystal grains are fine, the mechanical strength of a material is increased, and therefore, pulverization and deterioration by lattice expansion and shrinkage due to charge and discharge are suppressed, and the cycle life is expected to be extended. However, if the average crystal grain diameter is less than 100 nm, an increase in the discharge capacity may be retarded substantially. Further, since an insertion reaction occurs in charge and discharge in the alloy mainly formed of the intermetallic compound phase and also represented by the above formula (2), strain caused by lattice expansion and shrinkage during charge and discharge is small by nature. For this reason, the larger limit of the crystal grain diameter may be about 10 μm, that is, the average powder particle size when ground to the size of alloy powder necessary for fabrication of the negative electrode.

The alloy represented by the above formula (2) comprises a predetermined crystal structure comprising Sn, R element and M element as essential components, and has a characteristic of satisfying both high capacity and long cycle life by controlling the texture and phase, and further, the initial charge and discharge efficiency is enhanced by comprising Z as an essential component. The reasons of using these elements are explained below.

1) Sn (tin)

Sn is an element capable of forming an alloy with lithium, and is an essential component for producing a charge and discharge characteristic. When the Sn amount b is in a range of 38 at. % or more and 55 at. % or less, the texture of single phase or plural phases having an excellent charge and discharge characteristic can be controlled. If b is less than 38 at. %, texture control is not easy, and it is hard to obtain a high capacity. If b exceeds 55 at. %, on the other hand, the Sn phase begins to deposit, so that long cycle life is not obtained in charge and discharge cycles. A more preferred range is 40 at. % or more and 52 at. % or less.

2) R (Rare Earth Element)

R is at least one element selected from rare earth elements, and examples of the rare earth elements include Y, La, Ge, Pr, Nd, Pm, Sm, Eu, Gd, Tb, Dy, Ho, Er, Tm, Yb and Lu. R hardly forms an alloy with lithium, and this element contributes particularly to the discharge reaction. By adding Sn in a range of 45 at. % or more and 60 at. % or less and specifying the R element amount "a" at 35 at. % or less, the texture of single phase or plural phases can be controlled. If "a" is more than 35 at. %, a melting point of a material of an R—Sn base alloy is too high, and texture control is not easy, so that a high capacity or long cycle life is hardly obtained. On the other hand, if "a" is less than 5 at. %, the Sn phase begins to deposit, and thus, long cycle life is not obtained in charge and discharge cycles. A more preferred range is $7 \leq a \leq 28$. In particular, when A element is contained in the alloy, the total of A element and R element may be 11 at. % or more.

Examples of the R—Sn phase include phases of $RSn_3$, $R_3Sn_5$, $R_2Sn_3$, $RSn$, $R_2Sn_5$, $R_3Sn_7$, and $R_{11}Sn_{10}$ by atomic ratio may be used, but smaller contents are preferred.

In particular, since La, Ce, Pr and Nd can form an eutectic texture with Sn, the texture and crystal grain diameter can be controlled easily by a rapid solidification method, and they are preferred for longer cycle life.

3) M Element

Like R, M is also an element hardly forming an alloy with Li, and by adding M element to the R—Sn alloy, fine crystal grains can be obtained, the phase can be controlled, and longer cycle life is obtained. Its amount c is 30 at. % or less. If exceeding 30 at. %, the capacity drops. If the content is too small, the effect is not sufficient, and therefore, the content is preferably 8 to 30 at. %, and more preferably 10 to 25 at. %. From the viewpoint of longer cycle life, Co, Ni, Cu, Fe and Mn of the M elements are preferred. By adding the M element, the R—Sn-M phase can be formed, such as $R_3Sn_7M_2$ phase, $R_3Sn_6M_2$ phase, and $R_3M_6Sn_{18}$ by atomic ratio, but other compound phases at other integer ratios or compound phases at non-integer ratios may also included in the scope of the embodiment of the invention.

4) T Element

T element can form a solid solution with the R—Sn phase, R—Sn-M phase, Sn-M phase or R-M phase, or can form a novel phase (for example, X-T phase by adding together with X) in the R—Sn phase, R—Sn-M phase, Sn-M phase or R-M phase, and contributes to enhancement of the cycle life characteristic. The content of T element in the alloy is preferred to be $0 \leq d \leq 10$ by at. %. If d exceeds 10 at. %, a high capacity is not obtained. More preferably, it is 8 at. % or less. The lower limit is preferred to be 0.1 at. % or more. Among T elements, Ti, Nb and Mo are preferred from the viewpoint of enhancing the characteristic.

5) X Element

X element can also form an alloy with Li, and by the presence of this element, the cycle life can be extended without lowering the discharge capacity so much. The content is $0 \leq e \leq 20$ by at. %. If e exceeds 20 at. %, the capacity drops gradually. One of the factors of capacity drop is lowering of discharge capacity per unit volume due to decrease of density of the negative electrode active material. The lower limit is 0.1 at. %. Preferably, it is 15 at. % or less. Among X elements, Si, Al and In are preferred.

6) A Element

A element occupies the site of R element in the crystal structure, and its amount is 20 at. % or less, and the capacity drops if exceeding this amount. A more preferred range is $0 \leq f \leq 15$. The lower limit is preferably 0.1 at. %. From the viewpoint of enhancement of the characteristic, Mg and Ca are more preferable. The atomic ratio of Sn, R element (rare earth element), A element (for example, Ca), and transition metal is preferred in the sequence of Sn>R element (rare earth element) plus A element (for example, Ca)>transition metal. As a result, the ratio by weight of Sn in the alloy can be increased, so that a high capacity is obtained.

In particular, by selecting at least one R element from the group consisting of La, Ce, Pr and Nd, and at least one A element from Ca and Mg, it is preferred to contain by $12 \leq a+f \leq 35$ from the viewpoint of the capacity and cycle life. It is particularly preferred to select Ca as A element and contain the total of "a" and f by $15 \leq a+f \leq 35$, and in this case, more preferably $a \geq f$.

7) Z Element

Z element is an element effective for enhancing the initial charge and discharge efficiency. Although the mechanism is not clear, it invades an interstitial site of a crystal structure formed of R, M and Sn (for example, a rhombohedral system), and occupies part of the site of Li, which is considered to enhance the initial efficiency. Z element is at least one element selected from C, N, P, and B, and is preferably C or N. The amount g is preferably 30 at. % or less, which is effective for enhancing the initial efficiency, and if exceeding 30 at. %, the capacity is lowered. Preferably it is 25 at. % or less.

The value d, value e, and value f showing contents of element T, element X and element A include 0 (zero). If value d or value e is 0, the initial capacity can be increased. On the other hand, when value d and value e are set in a predetermined range, the initial capacity is slightly lowered, but the cycle life is extended. Therefore, depending on whether the initial capacity or cycle life is more important, it is preferred to set value d or value e to a predetermined value. Value f is preferred to be larger than 0 because a higher capacity is possible while maintaining the charge and discharge cycle life.

Among the compositions represented by the above formula (2), the composition containing at least one element selected from La, Ce, Pr and Nd as R element, Ni as M element, and Sn is preferred because a long charge and discharge cycle life is obtained.

The alloy according to the second embodiment is fabricated by heat treatment of the alloy containing a second main phase of an intermetallic compound phase comprising, for example, R element, Sn and M element as essential components, for 10 minutes or more and 10 hours or less in a temperature range of 200° C. or more and 800° C. or less in an atmosphere containing a gas component including C or N, so as to have a composition as shown in the above formula (2).

This heat treatment allows C and N elements to invade an interstitial site of a crystal lattice of at least second main phase (or including subsidiary phase depending on the case). Therefore, while maintaining the crystal structure of the second main phase, it is possible to obtain an alloy that contains the first main phase of the intermetallic compound phase comprising R element, Sn, M element and Z element as essential components and has a composition represented by the above formula (2). In the case of a carbon atom, meanwhile, by melting a compound containing carbon atoms and mixing with an alloy, a carbon atom can invade into a crystal lattice of the alloy, but the gas treatment mentioned above can enhance the activity of the carbon and nitrogen atom. Consequently, C and N atoms can be invaded into a site having a relatively higher stability of Li, out of interstitial sites of the crystal lattice.

When introducing C, any gas containing carbon may be used, and hydrocarbon gases such as $CH_4$, $C_2H_4$, $C_2H_6$ and $C_3H_8$ may be used. Further, $H_2$ may be mixed in. The ratio is in a range of 1:9 to 9:1 by flow rate ratio. The treating temperature is in a range of 200° C. or more and 800° C. or less, and the treating time is desirably between 10 minutes and 10 hours. After invasion of carbon, a homogenizing heat treatment may be conducted at the same temperature or lower temperature, in an inert atmosphere, for example, an Ar atmosphere. The required time for this treatment is 10 minutes to 10 hours. The process may be followed by a cooling process at cooling speed of 10° C./min to 100° C./hr.

When introducing nitrogen into the crystal lattice, the gas to be used may be solely $N_2$, a mixed gas of $N_2$ and $H_2$, or a mixed gas of $NH_3$ and $H_2$. The ratio is in a range of 1:9 to 9:1 by flow rate ratio. The treating temperature is in a range of 200° C. or more and 800° C. or less. The treating time is desirably between 10 minutes and 10 hours. After invading nitrogen, a homogenizing heat treatment may be conducted at same or lower temperature in inert atmosphere. The required time is 10 minutes to 10 hours. The process may be followed by a cooling process at a cooling speed of 10° C./min to 100° C./hr.

If the flow rate of the compound gas containing C or N is smaller, the treating temperature is lower, or treating time is shorter, the bias of Z element distribution in the alloy may be increased. Or, if the gas flow rate is too large or the treating time is too long, C or N may invade another site, and the characteristic may deteriorate. On the other hand, if the treating temperature is too high, the alloy melts, and therefore, it may be difficult to force the C atom or N atom into the crystal lattice.

A method of manufacturing the alloy containing the second main phase of the intermetallic compound phase comprising R element, Sn and M element as essential components include a high frequency induction heating method, an arc heating method, a sintering method, a rapid solidification method, a strip casting method, an atomizing method, a plating method, a CVD method, a sputtering method, and a rolling method. Particularly preferred methods include a rapid solidification method, a strip casting method, a high frequency induction heating method, an atomizing method, and a centrifugal atomization method.

These methods are intended to melt the preliminarily weighed materials in a crucible in an inert atmosphere, and change the subsequent cooling processes individually. That is, in the rapid solidification method, a molten alloy is injected onto a cooling body rotating at high speed, and flake-shaped samples of 10 to 50 µm in thickness are obtained. In the strip casting method, an amount of a molten alloy supplied on a cooling body per unit time is increased as compared with the case of the rapid solidification method, and flake-shaped samples of 100 to 500 µm in thickness are obtained. In the rapid solidification method, samples of up to 100 µm in thickness can be obtained depending on conditions. Also in the strip casting method, when pouring the molten alloy on the rotating roll as the cooling roll at the time of casting, the material plate thickness is controlled by the molten alloy supply amount and the rotating speed of the cooling roll, and thereby the cooling speed can be controlled. By heat treatment of the obtained samples, the texture and composition can be homogenized, and this is particularly prominent in cast samples. Heat treatment may not be needed in samples obtained by the strip casting method or rapid solidification method. In particular, a columnar crystal texture is easily obtained in the material obtained by the strip casting method, and this texture is preferred from the viewpoint of increased cycle life.

The electrode material according to the second embodiment is preferred to be spherical powder. As a result, since the specific surface area of the electrode material is reduced, the oxygen content in the electrode material may be smaller, and a high initial efficiency is obtained. Slurry coating performance is excellent at the same time. Moreover, the pulverizing process is not needed and the method of manufacturing an electrode material is simplified. To obtain spherical powder, the atomizing method or centrifugal atomization method is preferred.

In the gas atomizing method, raw materials prepared so as to have a predetermined composition are put into a crucible, and melted by a high frequency induction heating furnace in a vacuum or inert atmosphere (for example, Ar gas, He gas, nitrogen gas), and a molten alloy is dropped into an atomizing tank through a feeding pipe. A gas atomizing nozzle is disposed near the feeding ping, and atomizing gas is injected into the dropping molten alloy from a hole or slit of the nozzle. By injecting gas energy, the molten alloy is splashed, solidified and formed into powder. This tank is filled with an inert atmosphere, and oxidation of the generated atomized powder is prevented. The generated powder alloy is introduced from the lower part of the atomizing tank to the powder stock, and is stored in the powder stock.

The alloy shape obtained by the gas atomizing method ranges from a spherical shape to a flat shape by varying the conditions, and a spherical shape is preferred in the embodiments as far as possible. The particle size of powder generated by the gas atomizing method generally becomes smaller as the energy of injection gas applied to the dropping molten alloy is increased. The energy of the injection gas can be adjusted by, for example, gas pressure, or size or layout of holes or slits of the nozzle. If the energy of the injection gas is constant, the powder particle size is smaller when the amount of the molten alloy dropped per unit time is smaller. The amount of the molten alloy dropped can be adjusted by the inside diameter of the feeding tube or pressure applied to the molten alloy in the feeding tube. The gas atomizing method is characterized by simultaneous operation of solidification and pulverizing.

In the centrifugal atomization method, on the other hand, the molten alloy adjusted to a predetermined composition is dropped on the disk rotating at high speed in an inert atmosphere (for example, Ar gas, He gas, nitrogen gas), and dispersed and splashed from the disk by a centrifugal force, and spherical powder is formed by surface tension. In this case, splashing is difficult if wettability is high between the molten alloy and the disk, and thus, a ceramic or metal material relatively low in wettability with the molten alloy is preferably used. The inert atmosphere is preferably He gas from the viewpoint of heat conduction, and Ar gas may be also used. The diameter of the spherical powder can be controlled by the amount of the molten alloy dropped, the rotating speed of the disk, or the temperature of the molten alloy.

The particle diameter of the obtained spherical powder is preferably 10 to 200 μm, and in particular, the particle diameter of 10 to 60 μm is preferred for the negative electrode material. Larger particles may be further pulverized. The pulverization is preferred to be carried out in an inert atmosphere. Or, after coating a current collector with a slurry containing the spherical powder for manufacturing an electrode, the coated current collector is pressed, thereby crushing the spherical powder.

The spherical powder used herein refers to powder of which ratio of the longer diameter to the shorter diameter is 5 or less contained by 50% or more by weight of spherical powder.

The atomized power can be generally used without heat treatment, but may be heated in order to lessen the internal strain caused by quenching. In such a case, heat treatment is performed in an inert atmosphere, preferably. The heat treatment temperature is preferably the solidus temperature or less. It is desirable for the difference between the heat treatment temperature and the solidus temperature to be 50° C. or more. More preferably, it is 100° C. or less.

Inevitable impurities other than constituent elements may be contained by 5000 ppm or less. The inevitable impurities include oxygen. The oxygen amount after grinding is preferred to be 10000 ppm or less including the adsorption portion.

In the case of an alloy obtained by an ordinary casting method, an excellent electrode characteristic is obtained more easily than in an as-cast state after heat treatment.

In the nonaqueous electrolyte battery comprising a negative electrode containing a negative electrode material as a negative electrode active material, the R phase, R-M phase, Sn phase or LiSn phase may be formed in the negative electrode if the irreversible capacity occurs by charge and discharge cycles.

An explanation follows a nonaqueous electrolyte battery using the electrode material according to the first embodiment or the electrode material according to the second embodiment. The nonaqueous electrolyte battery comprises: a negative electrode containing the electrode material according to the first embodiment or the electrode material according to the second embodiment; a positive electrode; and a nonaqueous electrolyte layer provided between the positive electrode and the negative electrode.

1) Negative Electrode

The negative electrode includes a current collector, and a negative electrode active material-containing layer carried on one side or both sides of the current collector.

The negative electrode is manufactured, for example, by suspending a negative electrode mixture contains: a negative electrode active material containing the electrode material according to the first embodiment or the electrode material according to the second embodiment; a conductive agent; and a binder in a proper solvent to be mixed, applying the slurry to one side or both sides of the current collector, and drying.

By using, as the negative electrode active material, a mixture of the electrode material according to the first embodiment or the electrode material according to the second embodiment, and a carbonaceous material of high intercalating capacity of alkaline metal, the insertion amount of alkaline metal such as lithium can be improved. As the carbonaceous material for use in such a negative electrode active material, a graphitized carbonaceous material is preferred. In this case, by using only graphite of high intercalating capacity of alkaline metal, the conductivity is lowered. Therefore, it is preferred to use graphite together with a carbon material such as acetylene black or carbon black as a conductive agent.

Examples of the binder include polytetrafluoroethylene (PTFE), polyvinylidene fluoride (PVdF), fluororubber, styrene-butadiene rubber (SBR), and carboxy methyl cellulose (CMC).

The blending ratio of the negative electrode active material, conductive agent and binder is preferred to be in a range of the negative electrode active material of 70 to 95 wt. %, the conductive agent of 0 to 25 wt. %, and the binder of 2 to 10 wt. %.

The current collector is not particularly limited as long as it is a conductive material. Usable examples include a foil, mesh, punched metal, or lath metal of copper, stainless steel, or nickel.

2) Positive Electrode

The positive electrode includes a current collector, and a positive electrode active material-containing layer carried on one side or both sides of the current collector.

The positive electrode is manufactured, for example, by suspending a positive electrode active material, a conductive agent, and a binder in a proper solvent, applying the obtained suspension on the surface of the current collector such as aluminum foil, drying and pressing.

The positive electrode active material is not particularly limited as long as it can intercalate alkaline metal at the time of charge of the battery, and deintercalate alkaline metal at the time of discharge.

Examples of the positive electrode active material include various oxides and sulfides, including, for example, manganese dioxide ($MnO_2$), lithium manganese composite oxide (for example, $LiMn_2O_4$ or $LiMnO_2$), lithium nickel composite oxide (for example, $LiNiO_2$), lithium cobalt composite oxide (for example, $LiCoO_2$), lithium nickel cobalt composite oxide (for example, $LiNi_{1-x}Co_xO_2$), lithium manganese cobalt composite oxide (for example, $LiMn_xCo_{1-x}O_2$), and vanadium oxide (for example, $V_2O_5$). Organic materials such as a conductive polymer material and a disulfide polymer material may be also used.

More preferred positive electrode active materials are those high in battery voltage, such as lithium manganese composite oxide (for example, $LiMn_2O_4$), lithium nickel composite oxide (for example, $LiNiO_2$), lithium cobalt composite oxide (for example, $LiCoO_2$), lithium nickel cobalt composite oxide (for example, $LiNi_{0.8}Co_{0.2}O_2$), and lithium manganese cobalt composite oxide (for example, $LiMn_xCo_{1-x}O_2$).

The current collector is not particularly limited as long as it is a conductive material. In particular, as the current collector for a positive electrode, a material hardly oxidized during battery reaction is preferably used, and for example, aluminum, stainless steel, and titanium are preferred.

Examples of the conductive agent include acetylene black, carbon black, and graphite.

Examples of the binder include polytetrafluoroethylene (PTFE), polyvinylidene fluoride (PVdF), and fluororubber.

The blending ratio of the positive electrode active material, conductive agent and binder is preferred to be in a range of the positive electrode active material of 80 to 95 wt. %, the conductive agent of 3 to 20 wt. %, and the binder of 2 to 7 wt. %.

3) Nonaqueous Electrolyte Layer

The nonaqueous electrolyte layer can provide ion conductivity between the positive electrode and the negative electrode.

The nonaqueous electrolyte layer may contains a liquid nonaqueous electrolyte having an electrolyte dissolved in a nonaqueous solvent, the liquid nonaqueous electrolyte being held on a separator made of a porous material.

The separator holds the liquid nonaqueous electrolyte, and insulates between the positive electrode and the negative electrode. The separator is not particularly limited as long as it is made of an insulating material and has pores for allowing ion movement between the positive electrode and the negative electrode. Specific examples of the separator include a synthetic resin nonwoven fabric, a polyethylene porous film, and a polypropylene porous film.

The nonaqueous solvent may include cyclic carbonate such as ethylene carbonate (EC) and propylene carbonate (PC), and a nonaqueous solvent may contain as a main component a mixed solvent of any one of these cyclic carbonates and an organic solvent of a lower viscosity than the cyclic carbonates.

Examples of the organic solvent of lower viscosity include chain carbonate (for example, dimethyl carbonate, methyl ethyl carbonate, diethyl carbonate, etc.), γ-butyrolactone, acetonitrile, methyl propionate, ethyl propionate, cyclic ether (for example, tetrahydrofuran, 2-methyl tetrahydrofuran, etc.), and chain ether (for example, dimethoxy ethane, diethoxy ethane, etc.).

A lithium salt is used as the electrolyte. Specific examples of the electrolyte include lithium hexafluorophosphate ($LiPF_6$), lithium tetrafluoroborate ($LiBF_4$), lithium hexafluoroarsenate ($LiAsF_6$), lithium perchlorate ($LiClO_4$), and lithium trifluoromethasulfonate ($LiCF_3SO_3$). In particular, lithium hexafluorophosphate ($LiPF_6$) and lithium tetrafluoroborate ($LiBF_4$) are preferred.

The amount of the electrolyte dissolved in the nonaqueous solvent is preferred to be 0.5 to 2 mol/L.

The nonaqueous electrolyte layer may be realized in a gel form obtained by containing a liquid nonaqueous electrolyte in a polymer material. The nonaqueous electrolyte layer formed of a gel may be disposed between the positive electrode and the negative electrode, or the nonaqueous electrolyte layer having a gel formed in a separator thereof may be disposed between the positive electrode and the negative electrode.

A polymer material used for preparing a gel form may include, for example, a polymer of monomer such as polyacrylonitrile, polyacrylate, polyvinylidene fluoride (PVdF) and polyethylene oxide (PECO), or a copolymer with another monomer.

The electrolyte may be dissolved in a polymer material, and a solidified solid polymer electrolyte may be used as the nonaqueous electrolyte layer. Examples of the polymer material used when fabricating a solid polymer electrolyte include a polymer of monomer such as polyacrylonitrile, polyvinylidene fluoride (PVdF), and polyethylene oxide (PEO), or a copolymer with another monomer. An inorganic solid electrolyte may be used as the nonaqueous electrolyte layer. Such an inorganic solid electrolyte includes a ceramic material containing lithium. Specific examples thereof include $Li_3N$, $Li_3PO_4$—$Li_2S$—$SiS_2$, and LiI—$Li_2S$—$SiS_2$ glass.

The nonaqueous electrolyte battery according to the embodiment of the invention may be applied in various shapes including a cylindrical type, a prismatic type and a thin type. An example of a cylindrical type nonaqueous electrolyte battery is shown in FIG. 1, and an example of a thin type nonaqueous electrolyte battery is shown in FIG. 2.

For example, an insulator 2 is disposed at the bottom of a bottomed stainless steel container 1 of cylindrical shape. An electrode group 3 is contained in the container 1. The electrode group 3 has a positive electrode 4, a negative electrode 6, and a separator 5 interposed between them. The positive electrode 4, negative electrode 6, and separator 5 are wound spirally.

A liquid nonaqueous electrolyte is impregnated into the electrode group 3. An insulating paper 7 opened in the center is disposed above the electrode group 3 in the container 1. An insulating sealing plate 8 is crimped and fixed to an opening in the upper part of the container 1. A positive electrode terminal 9 is mounted to the center of the insulating sealing plate 8. One end of a positive electrode lead 10 is connected to the positive electrode 4, and the other end is connected to the positive electrode terminal 9. The negative electrode 6 is connected to the container 1 as a negative electrode terminal by way of a negative electrode lead (not shown).

As shown in FIG. 2, a flat type electrode group 11 has a flat structure comprising a positive electrode 12, a negative electrode 13, and a separator 14 interposed between them. A band-like positive electrode terminal 15 is electrically connected to the positive electrode 12. On the other hand, a band-like negative electrode terminal 16 is electrically connected to the negative electrode 13. The electrode group 11 is contained in a laminate film container 17, with ends of the positive electrode terminal 15 and negative electrode terminal 16 extended from the container 17. The laminate film container 17 is sealed by heat sealing.

The electrode group contained in the container is not limited to the spiral type shown in FIG. 1 or the flat type shown in FIG. 2, but the positive electrode, separator and negative electrode may be laminated in this sequence in plural layers.

Examples of the invention will be specifically described below with reference to the accompanying drawings.

EXAMPLES 1 to 15

<Fabrication of Positive Electrode>

2.5 wt. % of acetylene black, 3 wt. % of graphite, 3.5 wt. % of polyvinylidene fluoride (PVdF), and an N-methyl pyrrolidone (NMP) solution were added and mixed in 91 wt. % of lithium cobalt oxide ($LiCoO_2$) powder of a positive electrode active material, the mixed suspension was applied to a current collector of aluminum foil of 15 μm in thickness, and dried and pressed, and a positive electrode of electrode density of 3.0 g/cm³ was fabricated.

<Fabrication of Negative Electrode>

Predetermined amounts of elements were mixed in the composition ratio shown in Table 1, cast by high frequency induction heating, and heated in an inert atmosphere for 8 minutes at 650° C. to prepare an intermetallic compound, and a negative electrode active material was obtained.

In 85 wt. % of the intermetallic compound powder, 5 wt. % of graphite as a conductive agent, 3 wt. % of acetylene black as a conductive agent, 7 wt. % of PVdF, and an NMP solution were added and mixed, and the mixed suspension was applied to a current collector of copper foil of 11 μm in thickness, and dried and pressed, and a negative electrode was fabricated.

<Fabrication of Electrode Group>

A positive electrode, a separator made of a polyethylene porous film, a negative electrode, and a separator were laminated in this sequence, and then, wound spirally such that the negative electrode was positioned in the outermost layer, and an electrode group was fabricated.

<Preparation of Liquid Nonaqueous Electrolyte>

1 mol/L of lithium hexafluorophosphate ($LiPF_6$) was dissolved in a mixed solvent of ethylene carbonate (EC) and methyl ethyl carbonate (MEC) (mixing ratio by volume 1:2), and a liquid nonaqueous electrolyte was prepared.

The electrode group and nonaqueous electrolyte were contained in the bottomed stainless steel container of cylindrical shape, and a cylindrical nonaqueous electrolyte secondary battery as shown in FIG. 1 was assembled.

Intermetallic compounds used in secondary batteries of Examples 1 to 15 were analyzed by the X-ray diffraction method, and it was confirmed that the intermetallic compounds in Examples 1 to 15 contained the crystal phase of $Gd_3Ni_8Sn_{16}$ type.

COMPARATIVE EXAMPLE 1

A cylindrical nonaqueous electrolyte secondary battery was manufactured in the same manner as in Example 1, except that Si powder of average particle diameter of 10 μm was used as a negative electrode material.

COMPARATIVE EXAMPLE 2

A cylindrical nonaqueous electrolyte secondary battery was manufactured in the same manner as in Example 1, except that a mesophase pitch-based carbon fiber heated at 3250° C. (average fiber diameter of 10 μm, average fiber length of 25 μm, layer spacing $d_{(002)}$ of 0.3355 nm, and specific surface area by BET method of 3 m²/g) was used as a negative electrode material.

COMPARATIVE EXAMPLE 3

A cylindrical nonaqueous electrolyte secondary battery was manufactured in the same manner as in Example 1, except that $La_3Ni_2Sn_7$ having a $La_3Co_2Sn_7$ type crystal structure was used as a negative electrode material.

COMPARATIVE EXAMPLE 4

A cylindrical nonaqueous electrolyte secondary battery was manufactured in the same manner as in Example 1, except that $LaNi_{0.7}Sn_2$ having a $CeNiSi_2$ type crystal structure was used as a negative electrode material.

The secondary batteries of Examples 1 to 15 and Comparative examples 1 to 4 were tested by repeating charge and discharge cycles of charging up to 4.2 V in 3 hours at charge current of 1 A at 45° C., and discharging to 2.0 V at 1 A. Then, the initial discharge efficiency (ratio of the discharge capacity to the charge capacity at first cycle), discharge capacity per unit volume of the first cycle (mAh/cc), and capacity maintenance rate at the 100th cycle (on the basis of discharge capacity at first cycle as 100%) were measured, and results are shown in Table 1.

TABLE 1

| | Composition of negative electrode active material | Initial efficiency % | Discharge capacity per volume (mAh/cc) | Capacity maintenance rate at 100th cycle (%) |
|---|---|---|---|---|
| Example 1 | $La_3Ni_8Sn_{16}$ | 81 | 1280 | 85 |
| Example 2 | $La_3Ni_{7.5}Sn_{15.5}$ | 82 | 1203 | 84 |
| Example 3 | $La_3Ni_{7.5}Sn_{16.5}$ | 81 | 1445 | 80 |
| Example 4 | $La_3Ni_{8.5}Sn_{15.5}$ | 80 | 1221 | 88 |
| Example 5 | $La_3Ni_{8.5}Sn_{16.5}$ | 82 | 1342 | 86 |
| Example 6 | $(La_{0.7}Ca_{0.3})_3(Ni_{0.8}Co_{0.2})_8Sn_{16}$ | 81 | 1240 | 88 |
| Example 7 | $(Zr_{0.4}Ce_{0.6})_3(Ni_{0.7}Fe_{0.3})_{7.7}(Sn_{0.5}Ge_{0.5})_{16.3}$ | 82 | 1401 | 85 |
| Example 8 | $(La_{0.7}Ba_{0.3})_3(Ni_{0.6}Co_{0.4})_{7.9}(Sn_{0.9}Si_{0.1})_{15.8}$ | 83 | 1296 | 87 |
| Example 9 | $(La_{0.8}Mg_{0.2})_3(Ni_{0.8}Ti_{0.2})_{8.2}(Sn_{0.8}P_{0.2})_{16.2}$ | 81 | 1347 | 86 |
| Example 10 | $La_3(Ni_{0.5}Ti_{0.2}V_{0.3})_{8.4}(Si_{0.9}Sb_{0.1})_{15.8}$ | 82 | 1325 | 85 |
| Example 11 | $Ce_3(Ni_{0.9}Mn_{0.1})_{7.5}Si_{16.3}$ | 80 | 1264 | 86 |
| Example 12 | $(Ce_{0.3}Sr_{0.7})_3(Ni_{0.6}Zn_{0.3}Nb_{0.1})_{8.5}Sn_{15.9}$ | 81 | 1367 | 88 |

TABLE 1-continued

|  | Composition of negative electrode active material | Initial efficiency % | Discharge capacity per volume (mAh/cc) | Capacity maintenance rate at 100th cycle (%) |
|---|---|---|---|---|
| Example 12-2 | $(La_{0.7}Nd_{0.2}Pr_{0.05}Y_{0.05})_3(Ni_{0.6}Cu_{0.4})_{8.5}Sn_{15.9}$ | 82 | 1236 | 87 |
| Example 12-3 | $(Sm_{0.7}Pm_{0.05}Nd_{0.2}Hf_{0.05})_3(Ni_{0.6}Zn_{0.3}Nb_{0.1})_{8.5}Sn_{15.9}$ | 81 | 1265 | 87 |
| Example 13 | $La_3(Ni_{0.8}Cr_{0.2})_{8.1}Sn_{15.8}$ | 82 | 1352 | 83 |
| Example 14 | $Li_3La_3Ni_8Sn_{16}$ | 87 | 1278 | 85 |
| Example 15 | $Li_{1.5}La_3Ni_8Sn_{16}$ | 85 | 1282 | 84 |
| Comparative example 1 | Si | 81 | 9800 | 23 |
| Comparative example 2 | C | 95 | 498 | 98 |
| Comparative example 3 | $La_3Ni_2Sn_7$ | 73 | 1325 | 86 |
| Comparative example 4 | $LaNi_{0.7}Sn_2$ | 71 | 1211 | 89 |

As is clear from Table 1, in the secondary batteries of Examples 1 to 15 comprising the negative electrode having the alloy containing a crystal phase of $Gd_3Ni_8Sn_{16}$ type, the discharge capacity per unit volume is higher than in the secondary battery of Comparative example 2 using a carbonaceous material, and the capacity maintenance rate at the 100th cycle is higher than in the secondary battery of Comparative example 1 using Si.

As for the initial charge and discharge efficiency, it is higher in the secondary batteries of Examples 1 to 15, as compared with the secondary battery of Comparative example 3 using a $La_3Co_2Sn_7$ type alloy, or the secondary battery of Comparative example 4 using a $CeNiSi_2$ type alloy. To enhance the initial charge and discharge efficiency, two points are important: (1) to maintain a stable crystal structure after charging, and (2) the absence of extremely stable lithium in the crystal structure. The crystal structure of $Gd_3Ni_8Sn_{16}$ type satisfies these two conditions, and is hence considered to be high in initial charge and discharge efficiency. By comparison with Examples 1, 14 and 15, it is known that the initial efficiency is higher in the secondary batteries of Examples 14 and 15 using an intermetallic compounds containing lithium, as compared with the secondary battery of Example 1 using an intermetallic compound containing no lithium. This is because the charge capacity can be decreased without changing the discharge capacity due to lithium being preliminarily contained in the crystal structure.

In the secondary battery of Example 1 using $La_3Ni_8Sn_{16}$ as a negative electrode active material, FIG. 3 shows X-ray diffraction patterns of the negative electrode active material in three states, before electrode fabrication, in the initial state after electrode fabrication (before charge), and in the charge state.

As shown in FIG. 3, in the secondary battery of Example 1, the intensity of diffraction peaks (black spots in FIG. 3) appearing around 33° and 32.5° of the diffraction pattern before electrode fabrication is lowered by electrode fabrication. Black spot peaks in FIG. 3 are peaks not derived from $Gd_3Ni_8Sn_{16}$ but derived from impurities. Since these compounds react with lithium to form alloys, peaks are extinguished by charging as indicated by the diffraction pattern after charging.

Further, from the diffraction pattern after charging, diffraction peaks appearing around 33° and 32.5° are lost by charging, and the diffraction peak around 34° is shifted to the lower angle side. From the fact, it is known that Li is evidently intercalated in the intermetallic compound during charge.

EXAMPLES 16 to 30

<Fabrication of Positive Electrode>

2.5 wt. % of acetylene black, 3 wt. % of graphite, 3.5 wt. % of polyvinylidene fluoride (PVdF), and N-methyl pyrrolidone were added and mixed in 91 wt. % of lithium cobalt oxide ($LiCoO_2$) powder of a positive electrode active material, the mixed suspension was applied to a current collector of aluminum foil of 15 μm in thickness, and dried and pressed, and a positive electrode of electrode density of 3.0 g/cm³ was fabricated.

<Fabrication of Negative Electrode>

Predetermined amounts of elements were mixed in composition ratio shown in Table 2, and alloys were fabricated in methods (A) to (E) explained below. The composing phase of a second main phase of the obtained alloys was determined by the X-ray diffraction method, SEM and EPMA evaluation, and results are shown in Table 2. As shown in Table 2, the second main phase of each alloy is an intermetallic compound phase belonging to the $R_3M_2Sn_6$ type or $R_3M_2Sn_7$ type, and comprising R element, Sn and M element as essential components. Each of the alloys according to examples 16 to 30 is an alloy of single crystal phase or an alloy having plural crystal phases.

(A) Single Roll Method

Elements mixed at a composition ratio specified in Table 2 were melted by high frequency induction heating, and injected on a cooling roll rotating at high speed (30 m/s) to prepare flakes of 20 to 60 μm in thickness, and an alloy sample was obtained.

(B) Strip Cast Method

Elements mixed at a composition ratio specified in Table 2 were melted by high frequency induction heating, and poured on a cooling roll rotating at low speed (1 m/s) to prepare flakes of 200 to 500 μm in thickness, and an alloy sample was obtained.

(C) High Frequency Induction Heating Method

Elements mixed at a composition ratio specified in Table 2 were melted by high frequency induction heating, and cast on a water-cooled circular mold to a thickness of about 10 mm, and an alloy ingot was obtained. The obtained alloy ingot was heated in an inert atmosphere for 20 hours at 600° C., and an alloy sample was obtained.

(D) Gas Atomizing Method

Elements mixed at a composition ratio specified in Table 2 were melted by high frequency induction heating, and dropped into a gas atomizing chamber through a nozzle, high pressure Ar gas was applied to splash and cool, and spherical powder was obtained.

(E) Centrifugal Atomization Method

Elements mixed at a composition ratio specified in Table 2 were melted by high frequency induction heating, and dropped into a ceramic disk rotating at high speed in a He atmosphere through a nozzle to splash from the disk, and spherical powder was obtained.

The obtained alloy samples were treated by nitriding or carbonization in the gas composition, heat treatment temperature and heat treatment time specified in Table 2, and were further homogenized at the same temperature as the heat treatment temperature for 90 minutes in an Ar atmosphere. Then, the samples were further cooled slowly to room temperature, and negative electrode materials (negative electrode active materials) were obtained.

The composition of the obtained negative electrode material and the composing phase of the first main phase were determined by the X-ray diffraction, SEM and EPMA evaluation, and the first main phase was identified to be an intermetallic compound phase belonging to the $R_3M_2Sn_6$ type or $R_3M_2Sn_7$ type, and comprising R element, Sn, M element and Z element as essential components. The structure of the main phase and the composition of the negative electrode material are shown in Table 3.

Each of the first main phase and second main phase is recognized in the following method.

By a scanning electron microscope (SEM) image or an EBSD (electron backscatter diffraction) method, ten different fields having 20 or more crystal grains were imaged, and the occupied area ratio of the intermetallic compound in each viewing field was determined. From the fact that the average occupied area ratio of the intermetallic compound was larger than the average occupied area ratio in other phases, the intermetallic compound phase was recognized to be the main phase. In the negative electrode materials of the examples, the main diffraction peak has a lattice spacing d of 2.75 to 2.90 Å in the X-ray diffraction pattern.

Negative electrode materials were pulverized by a jet mill so as to have the average powder particle diameter of 8 to 10 μm are obtained, and negative electrode materials in powder form were obtained. In 85 wt. % of the obtained negative electrode material powder, 5 wt. % of graphite as a conductive agent, 3 wt. % of acetylene black as a conductive agent, 7 wt. % of PVdF, and NMP were added and mixed, the mixed suspension was applied to a current collector of copper foil of 11 μm in thickness, and dried and pressed, and a negative electrode was fabricated.

<Fabrication of Electrode Group>

A positive electrode, a separator made of a polyethylene porous film, a negative electrode, and a separator were laminated in this sequence, and wound spirally such that the negative electrode was positioned in the outermost layer, and an electrode group was fabricated.

<Preparation of Liquid Nonaqueous Electrolyte>

1 mol/L of lithium hexafluorophosphate ($LiPF_6$) was dissolved in a mixed solvent of ethylene carbonate (EC) and methyl ethyl carbonate (MEC) (mixing ratio by volume 1:2), and a liquid nonaqueous electrolyte was prepared.

The electrode group and nonaqueous electrolyte were contained in the bottomed stainless steel container of cylindrical shape, and a cylindrical nonaqueous electrolyte secondary battery was assembled.

COMPARATIVE EXAMPLE 5

A cylindrical nonaqueous electrolyte secondary battery was assembled in the same manner as in Example 16, except that the carbonaceous powder of a mesophase pitch carbon fiber heated at 3250° C. (average fiber diameter of 10 μm, average fiber length of 25 μm, layer spacing $d_{(002)}$ of 0.3355 nm, and specific surface area by BET method of 3 $m^2/g$) was used instead of alloy powder.

COMPARATIVE EXAMPLE 6

Cerium powder and tin powder weighed according to the composition specified in Table 2 were put in a stainless steel grinding container together with grindings balls in an argon atmosphere, and $CeSn_3$ was synthesized by a mechanical alloying process at room temperature. Lithium powder was added to the obtained $CeSn_3$, and $Li_{3.8}CeSn_3$ was synthesized by mechanical alloying. Using this alloy, a cylindrical nonaqueous electrolyte secondary battery was assembled in the same manner as in Example 16, except that nitriding treatment and carbonization treatment were skipped.

COMPARATIVE EXAMPLE 7

Elements mixed at a composition ratio specified in Table 2 were melted by high frequency induction heating, and an alloy was obtained from the molten alloy by a die casting method using a copper die. Using this alloy, a cylindrical nonaqueous electrolyte secondary battery was assembled in the same manner as in Example 16, except that nitriding treatment and carbonization treatment were skipped.

COMPARATIVE EXAMPLE 8

A cylindrical nonaqueous electrolyte secondary battery was assembled in the same manner as in Example 16, by using the alloy having the composition and main phase as shown in Table 2, except that nitriding treatment and carbonization treatment were skipped.

COMPARATIVE EXAMPLE 9

The alloy having the composition and main phase as shown in Table 2 was nitrided under the conditions shown in Table 2. This alloy was, as a result of nitriding, separated into two phases as shown in Table 3 (La—N phase and Ni—Sn phase). A cylindrical nonaqueous electrolyte secondary battery was assembled in the same manner as in Example 16, except that this alloy was used.

<Initial Capacity, Charge and Discharge Cycle Life, and Initial Discharge Efficiency>

The secondary batteries were tested at the measuring environment temperature set at 25° C., by charging up to 3.8 V in 3 hours at a charge current of 1.5 A, and discharging to 2.8 V at 1.5 A, and the discharge capacity per unit volume of the negative electrode material was determined from the initial capacity. In addition, the initial charge and discharge efficiency (ratio of discharge capacity to charge capacity of first cycle), and capacity maintenance rate after repeating charge and discharge 400 times (capacity at 400th cycle supposing the initial capacity to be 1) were measured, and the charge and discharge cycle characteristic was evaluated. Results are shown in Table 3.

TABLE 2

| | Composition of alloy sample before heat treatment (at. %) | Principal phase of alloy sample before heat treatment | Method of fabricating alloy sample | Gas composition | Heat treatment temperature (° C.) | Heat treatment time (min.) |
|---|---|---|---|---|---|---|
| Example 16 | $La_{25}Ni_{17}Sn_{58}$ | $R_3M_2Sn_7$ | A | $NH_3:H_2 = 1:2$ | 450 | 90 |
| Example 17 | $La_{28}Ni_{18}Sn_{54}$ | $R_3M_2Sn_6$ | B | $C_2H_4:H_2 = 1:2$ | 450 | 90 |
| Example 18 | $La_{20}Ca_5Ni_{17}Sn_{58}$ | $R_3M_2Sn_7$ | C | $NH_3:H_2 = 1:3$ | 420 | 90 |
| Example 19 | $La_{25}Ni_{14}Cu_3Sn_{58}$ | $R_3M_2Sn_7$ | D | $C_2H_4:H_2 = 1:3$ | 420 | 90 |
| Example 20 | $La_{25}Ni_{14}Fe_3Sn_{58}$ | $R_3M_2Sn_7$ | E | $NH_3:H_2 = 1:4$ | 400 | 90 |
| Example 21 | $La_{28}Ni_{14}Co_4Sn_{54}$ | $R_3M_2Sn_6$ | A | $C_2H_4:H_2 = 1:4$ | 400 | 120 |
| Example 22 | $La_{22}Ca_6Ni_{14}Cu_4Sn_{54}$ | $R_3M_2Sn_6$ | B | $NH_3:H_2 = 1:5$ | 380 | 100 |
| Example 23 | $La_{19}Ca_6Ni_{15}Mn_2Sn_{58}$ | $R_3M_2Sn_7$ | C | $C_2H_4:H_2 = 1:5$ | 380 | 120 |
| Example 24 | $La_{28}Ni_{14}Ti_2V_2Sn_{54}$ | $R_3M_2Sn_6$ | A | $NH_3:H_2 = 1:1$ | 450 | 60 |
| Example 25 | $La_{25}Ni_{15}Nb_2Sn_{58}$ | $R_3M_2Sn_7$ | B | $C_2H_4:H_2 = 1:1$ | 450 | 90 |
| Example 26 | $Ce_{20}Ba_5Ni_{14}Ta_3Sn_{58}$ | $R_3M_2Sn_7$ | C | $NH_3:H_2 = 1:2$ | 420 | 70 |
| Example 27 | $Ce_{28}Ni_{15}Co_3Sn_{49}Al_5$ | $R_3M_2Sn_6$ | A | $C_2H_4:H_2 = 1:2$ | 470 | 90 |
| Example 28 | $La_{20}Pr_5Ni_{17}Sn_{54}Si_4$ | $R_3M_2Sn_7$ | A | $NH_3:H_2 = 1:1$ | 370 | 90 |
| Example 29 | $La_{19}Nd_8Ni_{18}Sn_{53}P_2$ | $R_3M_2Sn_6$ | B | $C_2H_4:H_2 = 1:1$ | 380 | 90 |
| Example 30 | $La_{21}Gd_3Ni_{17}Sn_{57}B_2$ | $R_3M_2Sn_7$ | A | $NH_3:H_2 = 2:1$ | 380 | 90 |
| Comparative example 5 | C | — | — | — | — | — |
| Comparative example 6 | $Li_{3.8}CeSn_3$ (atomic ratio) | $RSn_3$ | — | — | — | — |
| Comparative example 7 | $Li_{5.0}MmSn_{2.70}V_{0.50}$ | $RSn_3$ | — | — | — | — |
| Comparative example 8 | $LaNi_{0.7}Sn_2$ (atomic ratio) | $R_3M_2Sn_6$ | B | — | — | — |
| Comparative example 9 | $La_{25}Ni_{17}Sn_{58}$ | $R_3M_2Sn_7$ | B | $NH_3:H_2 = 1:3$ | 850 | 90 |

TABLE 3

| | Composition of negative electrode active material (at. %) | Principal phase of negative electrode active material | Initial efficiency (%) | Discharge capacity per volume | Capacity maintenance rate at 400th cycle (%) |
|---|---|---|---|---|---|
| Example 16 | $La_{20}Ni_{13}Sn_{47}N_{20}$ | $R_3M_2Sn_7$ | 90 | 2.2 | 88 |
| Example 17 | $La_{22}Ni_{14}Sn_{43}C_{21}$ | $R_3M_2Sn_6$ | 90 | 1.9 | 90 |
| Example 18 | $La_{16}Ca_4Ni_{14}Sn_{48}N_{18}$ | $R_3M_2Sn_7$ | 86 | 2.3 | 86 |
| Example 19 | $La_{21}Ni_{12}Cu_2Sn_{48}C_{17}$ | $R_3M_2Sn_7$ | 86 | 2.2 | 85 |
| Example 20 | $La_{20}Ni_{12}Fe_3Sn_{49}N_{16}$ | $R_3M_2Sn_7$ | 85 | 2.2 | 80 |
| Example 21 | $La_{25}Ni_{12}Co_3Sn_{46}C_{14}$ | $R_3M_2Sn_6$ | 85 | 1.9 | 89 |
| Example 22 | $La_{19}Ca_5Ni_{12}Cu_3Sn_{47}N_{14}$ | $R_3M_2Sn_6$ | 83 | 2.0 | 89 |
| Example 23 | $La_{17}Ca_5Ni_{14}Mn_2Sn_{50}C_{12}$ | $R_3M_2Sn_7$ | 83 | 2.3 | 87 |
| Example 24 | $La_{21}Ni_{11}Ti_{1.5}V_{1.5}Sn_{42}N_{23}$ | $R_3M_2Sn_6$ | 90 | 1.9 | 90 |
| Example 25 | $La_{18}Ni_{12}Nb_2Sn_{45}C_{23}$ | $R_3M_2Sn_7$ | 90 | 2.3 | 86 |
| Example 26 | $Ce_{16}Ba_4Ni_{11}Ta_2Sn_{46}N_{21}$ | $R_3M_2Sn_7$ | 90 | 2.3 | 90 |
| Example 27 | $Ce_{22}Ni_{12}Co_2Sn_{39}Al_4C_{21}$ | $R_3M_2Sn_6$ | 90 | 1.9 | 89 |
| Example 28 | $La_{15}Pr_4Ni_{13}Sn_{40}Si_3N_{25}$ | $R_3M_2Sn_7$ | 90 | 2.4 | 86 |
| Example 29 | $La_{15}Nd_6Ni_{13}Sn_{39}P_2C_{25}$ | $R_3M_2Sn_6$ | 88 | 1.9 | 84 |
| Example 30 | $La_{16}Gd_2Ni_{12}Sn_{41}B_2N_{27}$ | $R_3M_2Sn_7$ | 86 | 2.0 | 84 |
| Comparative example 5 | C | — | 85 | 1 | 75 |
| Comparative example 6 | $Li_{3.8}CeSn_3$ | $RSn_3$ | 65 | 2.0 | 30 |
| Comparative example 7 | $Li_{5.0}MmSn_{2.70}V_{0.50}$ | $RSn_3$ | 70 | 2.1 | 40 |
| Comparative example 8 | $LaNi_{0.7}Sn_2$ | $R_3M_2Sn_6$ | 73 | 1.9 | 85 |
| Comparative example 9 | $La_{16}Ni_8Sn_{35}N_{41}$ | LaN phase, NiSn phase, LaSn phase | 65 | 1.6 | 35 |

(*) Discharge capacity per volume is relative value on the basis of Comparative example 5 as 1.

As is clear from Tables 2 and 3, in the secondary batteries of Examples 16 to 30, the discharge capacity per unit volume was higher than in the secondary battery of Comparative example 5 using a carbonaceous material as a negative electrode active material. Each of the batteries of Examples 16 to 30 comprises the negative electrode including the alloy the first main phase of the intermetallic compound phase comprising R element, Sn, M element, and Z element as essential components. And the alloy has the composition represented by the above formula (2).

The capacity maintenance rate at the 400th cycle was higher than in the secondary batteries of Comparative examples 6 and 7 using the alloy mainly formed of a $RSn_3$ phase as a negative electrode material. As for the initial discharge efficiency, it was higher as compared with the secondary batteries of Comparative examples 6 and 7, and the secondary battery of Comparative example 8 using the alloy without nitriding treatment and carbonization treatment as a negative electrode active material. In the case of the secondary battery of Comparative example 9 using the alloy synthesized in a nitriding heat treatment method of a temperature exceeding 800° C., it was separated into two phases (La—N phase and Ni—Sn phase) as a result of nitriding treatment, and the initial discharge efficiency and capacity maintenance rate at the 400th cycle were lowered as compared with the examples.

From these results, the secondary batteries of Examples 16 to 30 were found to satisfy the discharge capacity per volume, charge and discharge cycle characteristic, and initial charge and discharge efficiency at the same time.

In these examples, the cylindrical nonaqueous electrolyte secondary battery has been explained. However, the invention may be similarly applied to a prismatic type nonaqueous electrolyte secondary battery, a thin type nonaqueous electrolyte secondary battery, and others. Further, the electrode group contained in the battery container is not limited to the spiral type, but the positive electrode, separator, and negative electrode may be laminated in this sequence.

These examples have been applied in the nonaqueous electrolyte secondary battery, but the discharge capacity can be enhanced when applied in a nonaqueous electrolyte primary battery.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrode material comprising an alloy having a $Gd_3Ni_8Sn_{16}$ type crystal structure, wherein the alloy has a composition represented by following formula (1):

$$Li_zLn_3M1_xM2_y \qquad (1)$$

where Ln is at least one of elements having atom radius in a range of $1.6 \times 10^{-10}$ m or more and $2.2 \times 10^{-10}$ m or less; M1 is at least one element selected from the group consisting of Ti, V, Cr, Mn, Fe, Co, Ni, Cu, Zn and Nb; M2 is at least one element selected from the group consisting of P, Si, Ge, Sn and Sb; and x, y and z are atomic ratios wherein $7.5 \leq x \leq 8.5$, $15.5 \leq y \leq 16.5$, and $0 < z\, 3.0$.

2. The electrode material according to claim 1, wherein the electrode material is a negative electrode material wherein a nonaqueous electrolyte secondary battery has an initial efficiency of 80% or higher when the nonaqueous electrolyte secondary battery comprises a negative electrode comprising the negative electrode material.

3. The electrode material according to claim 1, wherein Ln is at least one element selected from the group consisting of La, Ce, Pr, Nd, Pm, Sm, Mg, Ca, Sr, Ba, Y, Zr and Hf.

4. The electrode material according to claim 1, wherein the element M1 is at least one of Co and Ni, and the element M2 is at least one of Sn and Si.

5. The electrode material according to claim 1, wherein the atomic ratio x is $7.8 \leq x \leq 8.4$.

6. The electrode material according to claim 1, wherein the atomic ratio y is $15.7 \leq y \leq 16.4$.

7. An electrode material comprising an alloy having a $Gd_3Ni_8Sn_{16}$ type crystal structure, wherein the alloy has a composition represented by following formula (1):

$$Li_zLn_3M1_xM2_y \qquad (1)$$

where Ln is at least one of elements having atom radius in a range of $1.6 \times 10^{-10}$ m or more and $2.2 \times 10^{-10}$ m or less; M1 is at least one element selected from the group consisting of Ti, V, Cr, Mn, Fe, Ni, Co, Cu, Zn and Nb; M2 is at least one element selected from the group consisting of P, Si, Ge and Sb; and x, y and z are atomic ratios wherein $7.5 \leq x \leq 8.5$, $15.5 \leq y \leq 16.5$, and $0 < z \leq 3.0$.

8. The electrode material according to claim 7, wherein Ln is at least one element selected from the group consisting of La, Ce, Pr, Nd, Pm, Sm, Mg, Ca, Sr, Ba, Y, Zr and Hf.

9. The electrode material according to claim 7, wherein the element M1 is at least one of Co and Ni, and the element M2 has at least Si.

10. The electrode material according to claim 7, wherein the atomic ratio x is $7.8 \leq x \leq 8.4$.

11. The electrode material according to claim 7, wherein the atomic ratio y is $15.7 \leq y \leq 16.4$.

* * * * *